US006095218A

United States Patent [19]

Delmolino et al.

[11] Patent Number: 6,095,218

[45] Date of Patent: Aug. 1, 2000

[54] TRANSFER SYSTEM FOR TRANSPORTING ARTICLES CUT FROM A BLANK OF MATERIAL

[75] Inventors: William P. Delmolino, Grantham, N.H.; Dale C. Merrill, White River Jct., Vt.; Raymond J. Merchand, Lebanon, N.H.

[73] Assignee: New Jersey Machine, Inc., Lebanon, N.H.

[21] Appl. No.: 08/895,600

[22] Filed: Jul. 16, 1997

[51] Int. Cl.[7] .......................... B26D 5/00; B32B 31/00; B44C 1/00

[52] U.S. Cl. .......................... 156/353; 156/256; 156/354; 156/542; 156/DIG. 37

[58] Field of Search .......................... 156/540, 541, 156/542, 353, 264, 256, 354

[56] References Cited

U.S. PATENT DOCUMENTS

| | | | |
|---|---|---|---|
| 3,431,827 | 3/1969 | Wahle et al. | 93/1 |
| 3,554,841 | 1/1971 | Wysocki et al. . | |
| 3,713,948 | 1/1973 | Kluger | 156/351 |
| 3,871,597 | 3/1975 | LaMers | 242/75.3 |
| 4,127,398 | 11/1978 | Singer, Jr. | 65/4 A |
| 4,284,457 | 8/1981 | Stonier et al. | 156/237 |
| 4,328,057 | 5/1982 | Gutow | 156/248 |
| 4,332,635 | 6/1982 | Holbrook et al. | 156/256 |
| 4,397,709 | 8/1983 | Schwenzer . | |
| 4,475,969 | 10/1984 | Reed | 156/152 |
| 4,544,431 | 10/1985 | King | 156/256 |
| 4,680,442 | 7/1987 | Bauer et al. | 219/121 LG |
| 4,707,211 | 11/1987 | Shibata . | |
| 4,787,833 | 11/1988 | Krall . | |
| 5,032,344 | 7/1991 | Kaminski | 264/509 |
| 5,225,029 | 7/1993 | Arita et al. | 156/556 |
| 5,308,435 | 5/1994 | Ruggles et al. | 156/465 |
| 5,413,651 | 5/1995 | Otruba | 156/64 |
| 5,415,716 | 5/1995 | Kendall | 156/256 |
| 5,486,253 | 1/1996 | Otruba | 156/215 |
| 5,487,807 | 1/1996 | Nedblake et al. | 156/353 |
| 5,520,966 | 5/1996 | Kornely, Jr. | 427/528 |
| 5,556,492 | 9/1996 | Vonderhorst et al. | 156/64 |
| 5,618,378 | 4/1997 | Cahill | 156/552 |
| 5,624,520 | 4/1997 | Nedblake et al. . | |
| 5,741,381 | 4/1998 | Dolence et al. | 156/64 |

FOREIGN PATENT DOCUMENTS

| | | |
|---|---|---|
| 2 170 178 | 7/1986 | United Kingdom . |

*Primary Examiner*—Richard Crispino
*Assistant Examiner*—Sue A. Purvis
*Attorney, Agent, or Firm*—Samuels, Gauthier & Stevens, LLP

[57] ABSTRACT

The invention relates generally to transport systems for cutting articles from a blank of material, and is well suited for use in, though not limited to, transporting and cutting labels from a web material and applying them to items. Specifically, an article transfer system is disclosed for transporting articles cut from a blank of material traveling in a first direction. The system comprises a support member including first and second surfaces and a plurality of openings extending between the first and second surfaces. The support member is movable along the first direction adjacent to the blank of material. The system also includes in one embodiment, a vacuum for generating a lower pressure adjacent to the second surface of the support member than the pressure adjacent to the first surface thereof such that the blank is urged to maintain contact with the first surface of the support member.

22 Claims, 8 Drawing Sheets

TRANSFER SYSTEM FOR TRANSPORTING ARTICLES CUT FROM A BLANK OF MATERIAL

BACKGROUND OF THE INVENTION

The invention relates generally to transport systems used when cutting articles from a blank of material, and is well suited for use in, though not limited to, transporting and cutting labels from a web material and applying them to items.

Cutting machines that cut (such as by laser or knife blade or die cut etc.) articles (such as labels or cards etc.) from a blank of material (such as a continuous web of material or sheets of material etc.) typically require that the cut article be immediately removed from the blank. This is because the cut article may fall free from the blank due to gravity or may become separated from the blank as the material travels through the system.

For example, machines that cut labels from a continuous web of material typically cut labels around preprinted designs on the web as the web material is advanced through a cutting assembly. The web material may include no adhesive, or may include either an active adhesive on one side together with a release liner, or a pressure sensitive or heat activatable adhesive on one side, the later generally being referred to as linerless web material.

Label cutting machines, however, that apply cut labels to items, must present each cut label to a moving item at a desired speed and frequency. Typically, the cut labels will be required to be spaced apart a significant distance for application to most items. This can be achieved in many ways. First, the labels could be cut from the web the same distance-apart as they will need to be spaced when applied to the items. This, however, is wasteful of web material. Second, the movement of the web could be intermittent such that the labels could be cut close to one another yet the time required to advance the web could be varied to be as slow or fast as necessary. Unfortunately, this is inefficient and introduces an increased chance of a label cut being misaligned. Third, labels, once cut close together, could be immediately transferred to a more rapidly moving conveyance that causes the labels to be further spaced from one another. This approach, however, is limited in that the handling of cut labels immediately after they are cut from the web is difficult with prior art techniques. This increases the chances of, among other things, inconsistent spacing of the labels as they are transferred to the more rapidly moving conveyance, particularly if the difference in speeds is great.

There is a need for an article transporting and cutting machine that is capable of efficiently and continuously cutting articles from a blank of material at any desired speed.

SUMMARY OF THE INVENTION

The invention provides an article transfer system for transporting articles cut from a blank of material traveling in a first direction. The system comprises a support member including first and second surfaces and a plurality of openings extending between the first and second surfaces. The support member is movable along the first direction adjacent to the blank of material. The system also includes in one embodiment, a vacuum for generating a lower pressure adjacent to the second surface of the support member than the pressure adjacent to the first surface thereof such that the blank is urged to maintain contact with the first surface of the support member.

The article cut from the blank, together with the remaining blank portion, are transferred along the support member together. Upon leaving the support member, the articles are separated from the blank and may be discharged for collection or transferred to a merge station where they are combined with other items. For example, the system may be used in a labelling machine for transporting and cutting labels from a web, and the merge station may include an application device for applying labels to items.

BRIEF DESCRIPTION OF THE DRAWINGS

The following detailed description of the illustrated embodiments may be further understood with reference to the accompanying drawings in which.

DETAILED DESCRIPTION OF THE ILLUSTRATED EMBODIMENTS

Although the embodiments shown in the Figures relate to labelling machines for cutting and applying labels to items, it is understood that the invention is suited for use in wide variety of machines for cutting articles from a blank of material. The blank of material may be a continuous web of material or may comprise sheets of material.

Figure 1:
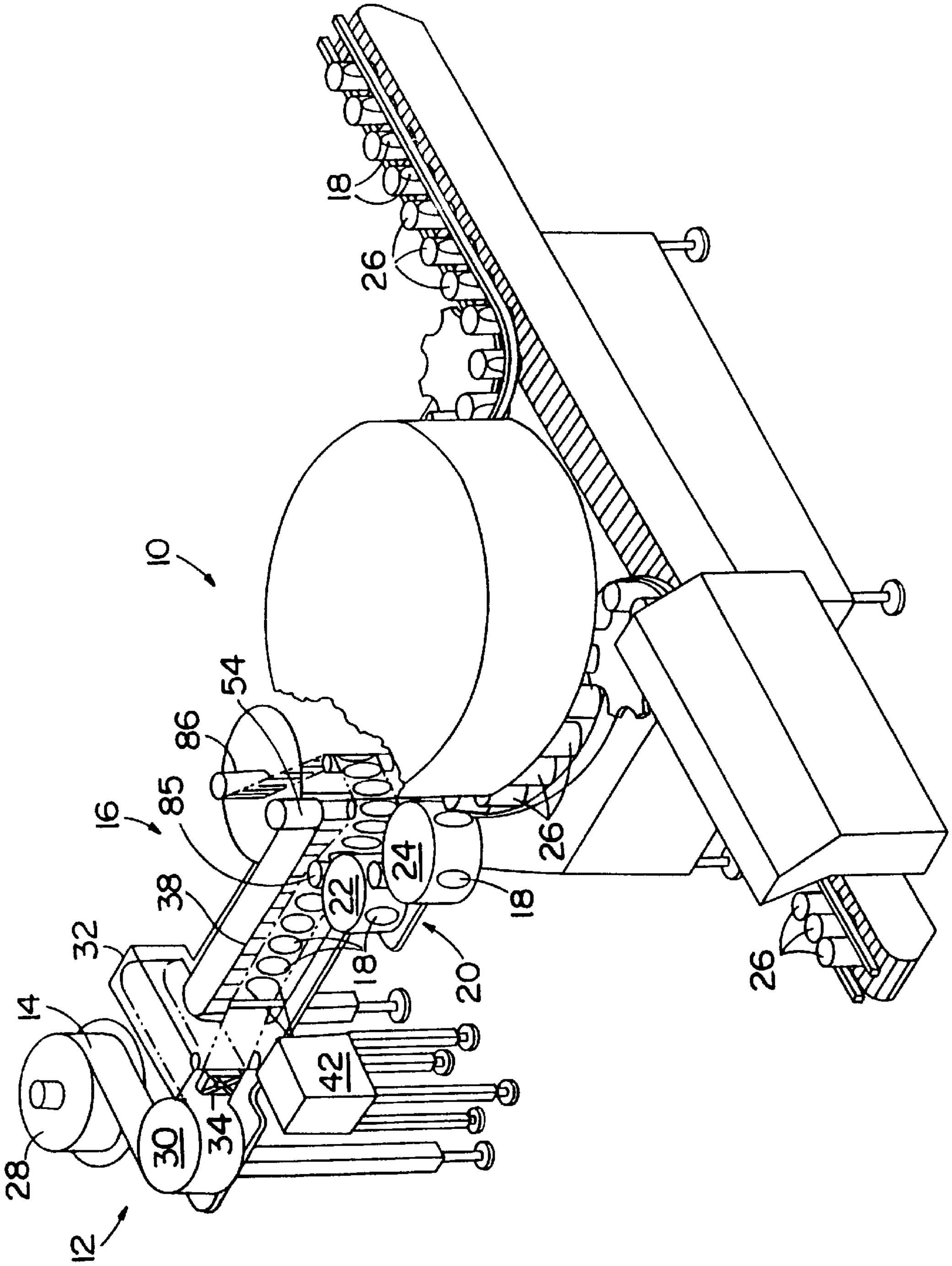
FIG. 1 shows a diagrammatic isometric view of a machine including a cutting assembly in accordance with an embodiment of the invention.

As shown in FIG. 1, a labelling machine 10 employing the benefits of the invention includes a feed station generally indicated at 12 from which web material 14 is delivered to a cutting station generally indicated at 16 where labels 18 are cut from the web 14. The cut labels 18 are then transported through the cutting station 16, to a transfer station generally indicated at 20 where they are transferred by vacuum drums 22 and 24 to items 26. The transfer of cut labels from the cutting station to items may be accomplished by any known means, or may be achieved by use of the Transfer Cylinder For Transporting Labels In A Labelling Machine disclosed in U.S. patent application Ser. No. 08/895,603, filed on the same date as the present application, the disclosures of which are hereby incorporated by reference.

The web of material 14 is first drawn from a supply roll 28 by a rotating vacuum drum 30. The web 14 then passes through a free loop chamber 32. The free loop chamber 32 includes a fan 34 that forces air against the web 14 causing a portion of the web 14 to be blown away from the fan 34 and into the chamber 32 as shown in FIG. 1. This arrangement has been found to maintain a sufficiently consistent tension on the web 14 as it travels toward the cutting station 16. In alternative embodiments, the free loop chamber may include a fan located at the opposite end of the chamber and positioned to move air away from the web, thereby drawing the web into a loop formation.

Figure 2:
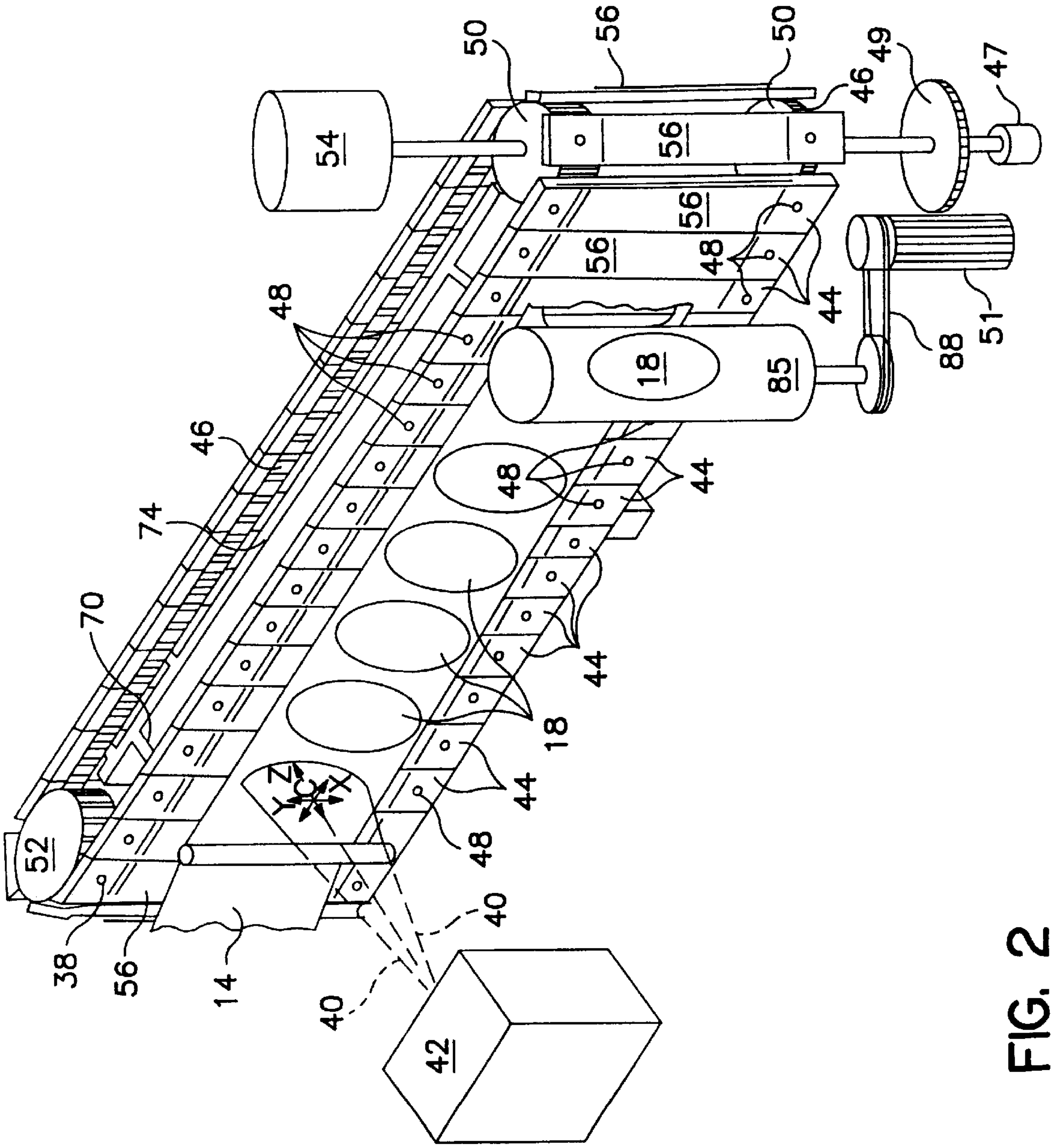
FIG. 2 shows a diagrammatic isometric view of the cutting assembly support structure of FIG. 1.

At the cutting station 16 the web is drawn along a rotating cutting platform 38 as further shown in FIG. 2, where one or two (two are shown) laser beams 40 contact the moving web 14 and cut a label 18 from the web 14. The laser beams 40 are free to move as may or may not be necessary in both the x and y directions (vertical and horizontal as shown) while the web is moving. The beams 40 may also have their focal points adjusted (i.e., movement in the z direction) as they travel further from the point C on the web 14 that is at the shortest distance between the laser unit 42 and the web 14. A suitable laser for use in the present invention may be, for example, the 100 Watt pulsed $CO_2$ laser sold by Synrad company of Mukilteo, Wash. In a preferred embodiment, two lasers are housed in laser unit 42 for simultaneously generating two beams 40 that cooperate to cut an article from the blank of material.

Figure 3:
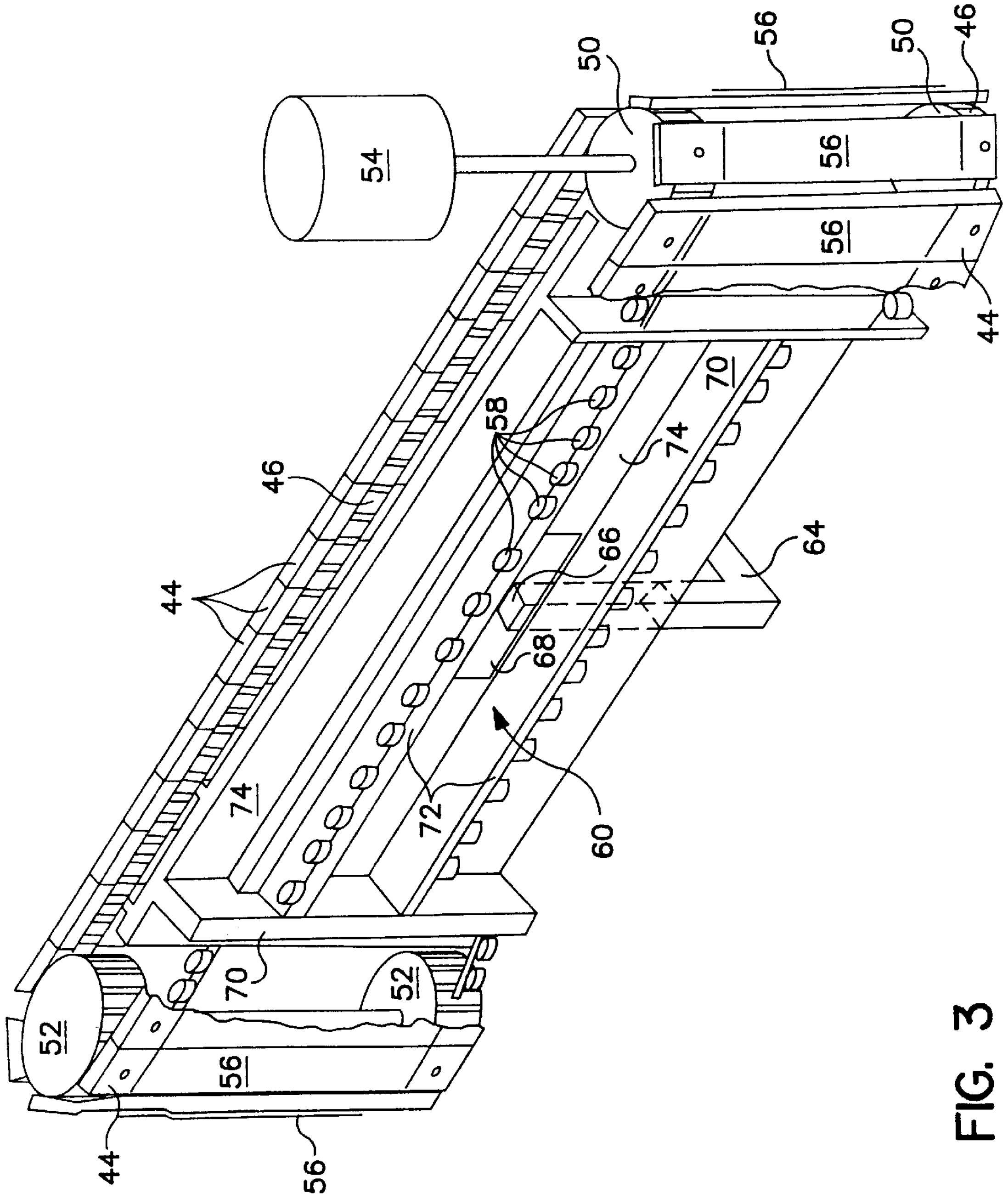
FIG. 3 shows the view of FIG. 2 with a portion of the cutting platform broken away.
Figure 4:
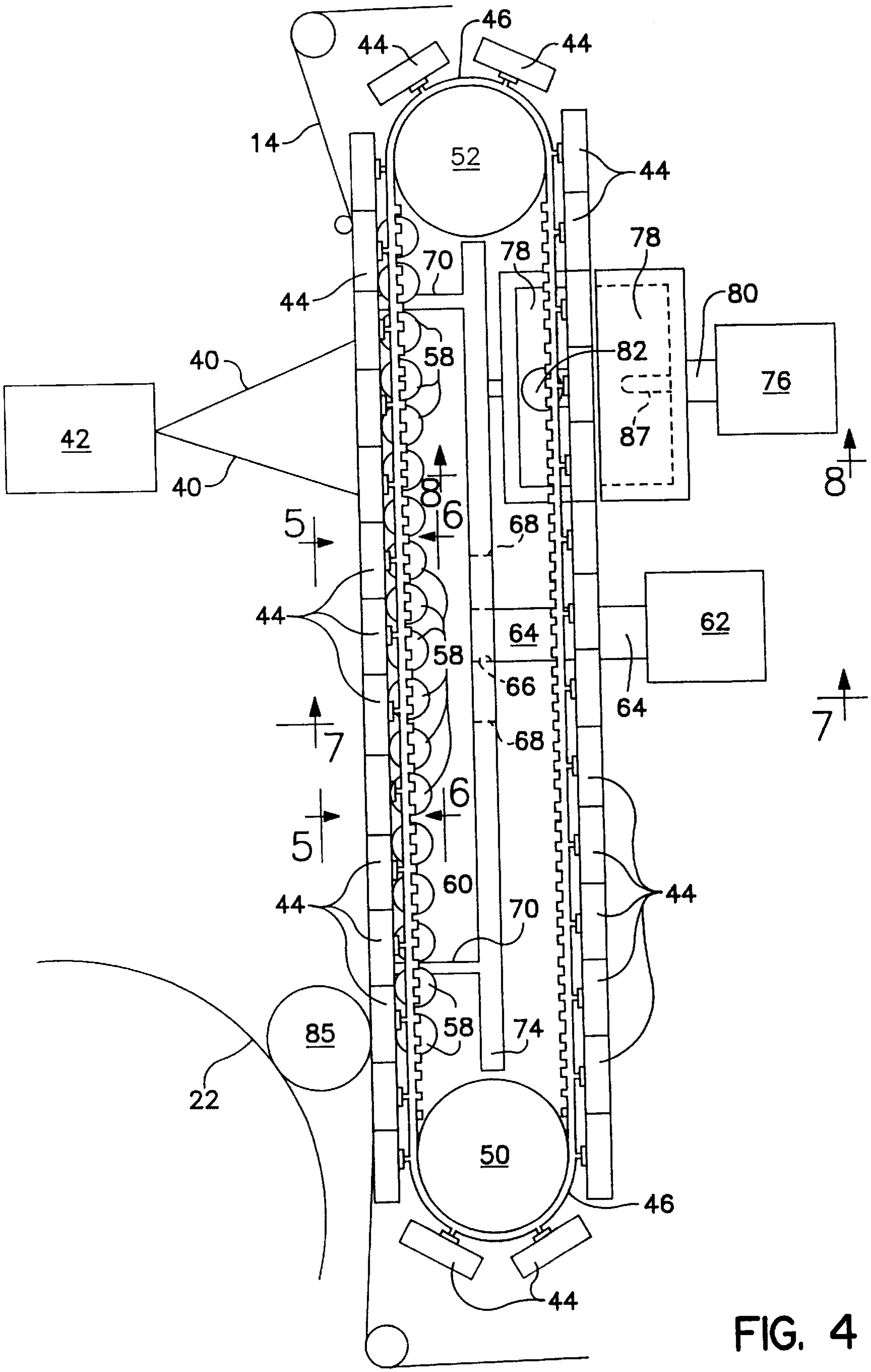
FIG. 4 is a top view of the cutting assembly of FIGS. 2 and 3.
Figure 5:
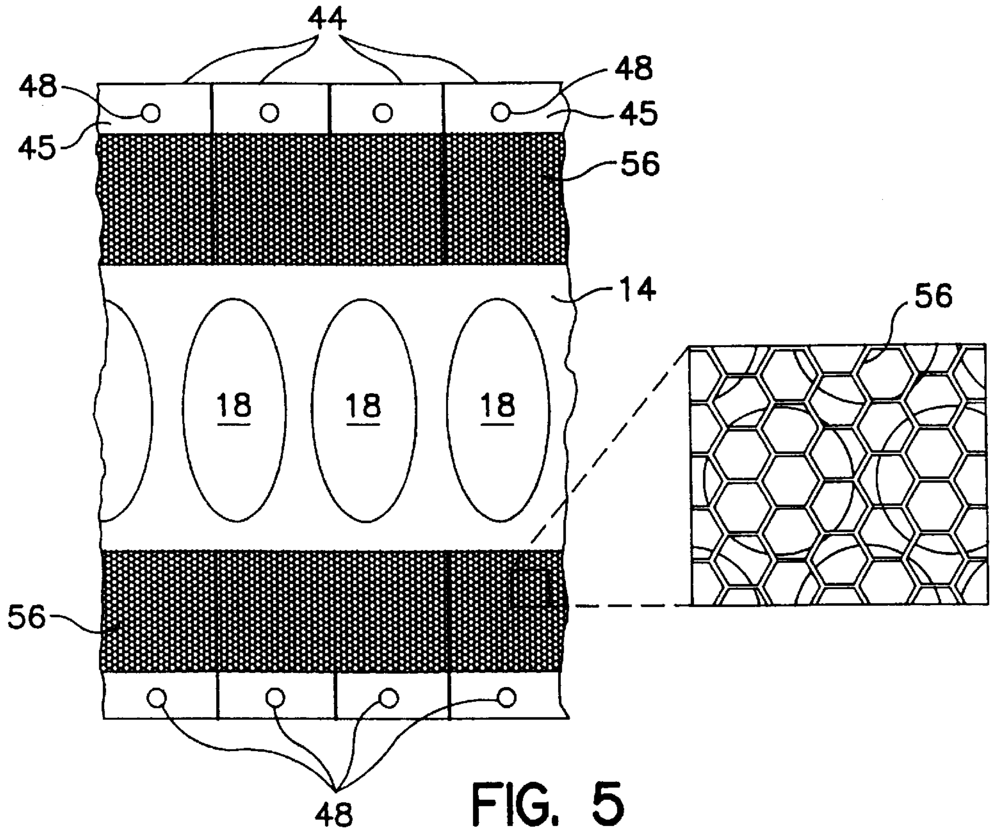
FIG. 5 is a view of the outer surface of the cutting platform in FIG. 2 taken along line 5—5 of FIG. 4.
Figure 6:
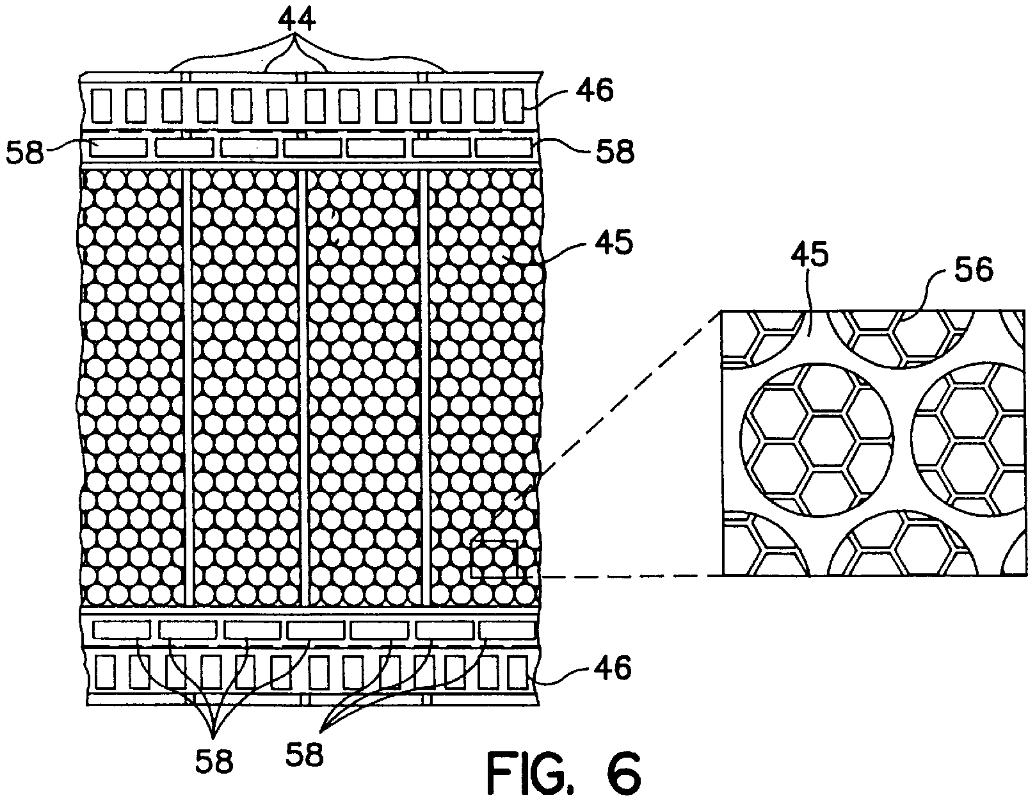
FIG. 6 is a view of the inner surface of the cutting platform of FIG. 2 taken along line 6—6 of FIG. 4.

FIGS. 2, 3 and 4 show the cutting station without the top covering shown in FIGS. 1, 5 and 6. As further shown in FIGS. 2, 4, 5 and 6 the cutting platform includes flat sections 44 of material 45 that are each connected to a pair of belts 46 at mounting holes 48. The belts 46 rotate between drive pulleys 50 and idler pulleys 52. The drive pulleys 50 are driven by a motor 54 that includes a shaft that passes through both the upper and lower drive pulleys 50 as shown.

With reference with FIGS. 2, 4, 5 and 6, each cutting platform section 44 includes a base 45 and a perforated aluminum honeycomb material 56 glued to the outer surface of each section 44. Each section 44 includes a plurality of openings larger than the openings in the honeycomb material 56 as shown in the enlarged portions of FIGS. 5 and 6. A vacuum is provided adjacent the inner surface through the openings in the materials 45 and 56 to urge the web material 14 to remain in contact with the outer surface sections 44. The honeycomb material 56 is employed due to its large ratio of open space to material. It is desirable to have as much open space on the cutting platform as possible not only to provide improved vacuum, but also to limit erroneous cutting by laser noise as the laser beam bounces off of the cutting platform. Unfortunately, however, the honeycomb mesh material 56 is rather fragile and must be supported by the aluminum support material 45 to which it is glued. The honeycomb mesh material 56 may comprise or be coated with a protective plating such as copper or aluminum. Rollers 58 are provided to provide support for the sections 44 as the web is being carried to the transfer station 20. In other embodiments any suitable means for supporting the cutting platform, such as a stationary low friction bar, may be used. In other embodiments, a variety of cutting surfaces may be employed, such as for example, a cutting drum, a flexible continuous cutting surface, or a non-rotating surface that travels forward and backward along the direction of movement of the blank of material from which articles are cut.

Figure 7:
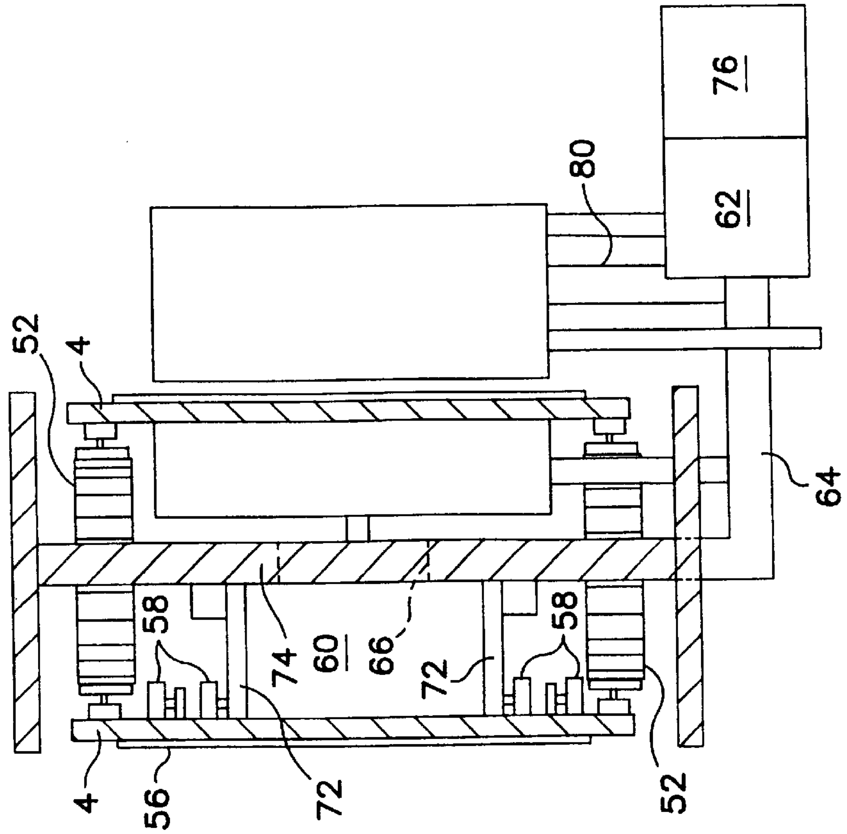
FIG. 7 is a sectional view of a portion of the cutting assembly of FIG. 4 taken along line 7—7 thereof.

With reference to FIGS. 3, 4 and 7 a vacuum is provided in the area designated generally at 60 by employing a vacuum blower 62, or any other suitable vacuum generating unit, in communication with the area 60 via conduit 64 and openings 66 and 68. The vacuum area is defined by vertical walls 70, adjustable walls 72, and a center wall 74. The vertical positions of walls 72 may be adjusted by raising and lowering each wall through known mechanical means. The adjustment of the positions of the walls 72 permits the system to readily accommodate articles of a variety of sizes. The vacuum holds the web 14 against the sections 44, causing the web material to be advanced along the cutting platform formed by the sections 44 as the drive pulleys 50 pull the belts 46. In other embodiments, any method by which a lower pressure may be provided adjacent to the non-cutting side of the support structure may be employed, such as using a positive pressure blower on the cutting side.

The web 14 and sections 44 preferably move at the same speed. The laser 42 is programmed to cut labels 18 from the web 14 responsive to the speed of movement of the web as determined by the speed sensor 47 shown in FIG. 2. Specifically, the laser may automatically adjust its cutting timing to cut identical labels whether the web is not moving, moving intermittently, moving slowly or moving very quickly. Preferably, the web is moving at a constant speed for a particular job. The flexibility of the system is particularly advantageous in that adjustments to the laser operation need not be performed when the machine is used for labelling items of a variety of sizes.

As shown in FIG. 2, the shaft driving the drive pulleys 50 also drives a gear 49 that drives vacuum spindle 85 indirectly via reversing gear 51. Reversing gear 51 is designed to accommodate a range of vertical movement of the cutting assembly with respect to the stationary vacuum spindle 85.

Figure 8:
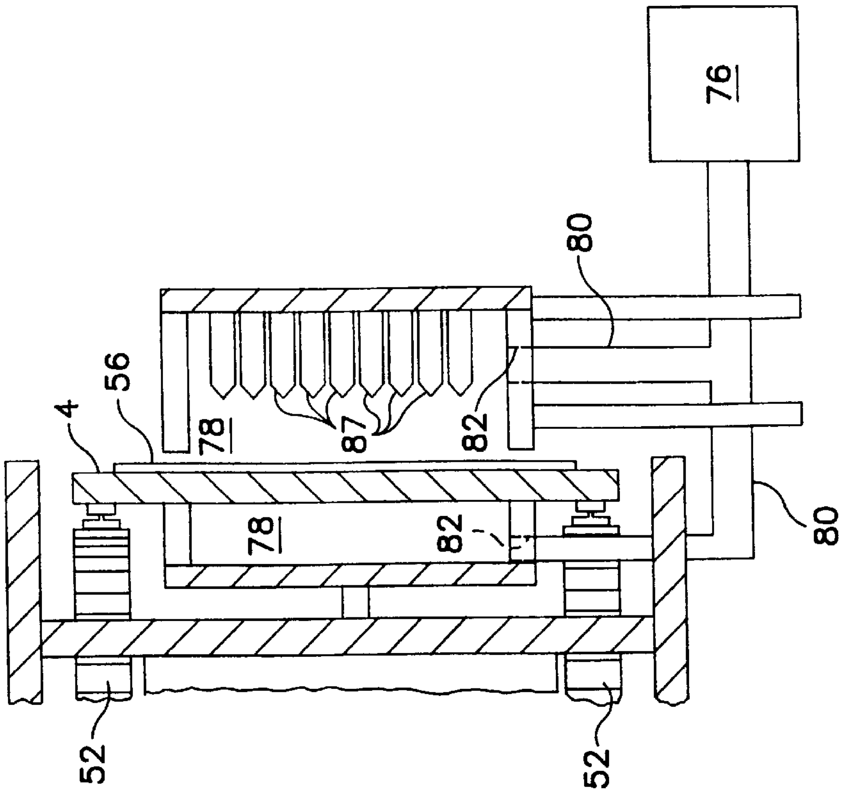
FIG. 8 is a partial sectional view of a portion of the cutting assembly of FIG. 4 taken along line 8—8 thereof.

A cleaning system is provided on the opposite side of the cutting station as the sections 44 travel in the return direction along the belts 46. The cleaning system removes cutting debris from the web 14, and includes one or more compressed air nozzles 87 positioned to blow air toward the sections 44. In other embodiments, any suitable means for generating air pressure may be provided such as using a fan. A vacuum blower 76 or other suitable means for creating a vacuum, is provided in communication with vacuum cleaning areas 78 via conduits 80 and conduit openings 82. The vacuum areas 78 are provided on both sides of the cutting sections 44 to collect debris on either side as shown in FIGS. 7 and 8.

With reference again to FIG. 1, the cut labels 18 are lifted off of the moving sections 44 by a pick-up spindle 85, and the scrap material continues to travel along with the sections 44 where it is wound onto a scrap take up roll 86. As shown in FIG. 2, the vacuum spindle is driven by a belt 88 connected to the drive shaft of the motor 54 for the drive pulleys 50.

Figure 9:
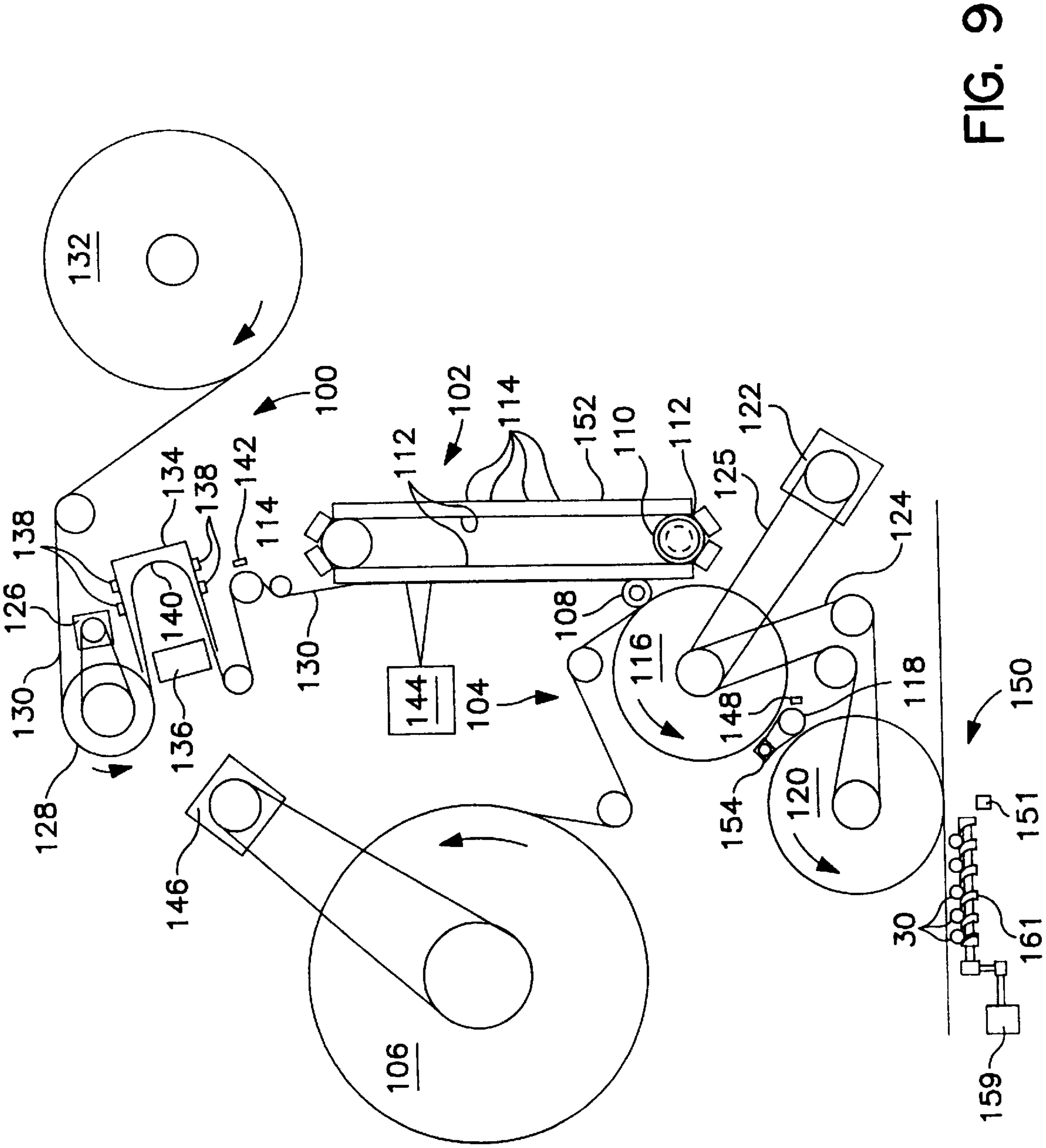
FIG. 9 is diagrammatic plan view of a transfer system of the invention together with another embodiment of an article cutting machine.

As shown in FIG. 9 in plan view, another embodiment of a system of the invention includes a feed station 100, a cutting station 102, and a transfer station 104. In the system shown in FIG. 9, the scrap take up roll 106 may be positioned on the cutting side of the cutting station 102. In the embodiment of FIG. 9, the labels 18 together with the scrap travel around the vacuum spindle 108, which is also driven by the motor 152 for the drive pulley 110 that drives the belt 112 carrying the cutting platform sections 114 using a reversing gear similar to that shown in FIG. 2. The cut articles are transferred to a vacuum drum 116, then to a position correction vacuum spindle 118, and finally to an application vacuum drum 120. One motor 122 may be used to drive both of the vacuum drums 116 and 120, which are connected together by a serpentine belt 124, by using a drive belt 125.

A motor 126 is employed to drive a vacuum drum 128 that pulls the web 130 from a supply roll 132 through the feed station 100. Similar to the embodiment described above, the web 130 travels through a free loop chamber 134 that includes a fan 136 and sensors 138. The sensors 138 are employed to monitor the relative position of the loop 140 within the free loop chamber 134. The motor 126 is continuously adjusted responsive to the outputs of the sensors 138 to maintain a desired amount of web material 130 within the free loop chamber.

A sensor 142 is positioned to detect the presence of predefined registration marks on the web 130 after the web 130 leaves the free loop chamber. Generally, the laser 144 is programmed to cut articles from the web 130 responsive to the positioning of the design at the sensor 142 in accordance with known means.

The articles are cut from the web as described above, and the scrap material is wound onto the scrap take up roll 106 which is driven by a motor 146 that employs a slip clutch, e.g., a magnetic particle clutch, to maintain a consistent tension on the relatively frangible scrap material.

Because the vacuum drum 116 may be moving at a speed that is faster than the speed of the web 130 as it travels through the cutting station, the position of the cut articles relative one another may need to be adjusted before the articles are applied to items. At the transfer station 104, the position of the cut article on the correction vacuum spindle 118 is monitored by a sensor 148. The correction spindle 118 is driven by a motor 154 and is employed to correct the position of any improperly positioned cut articles as they are passed between the vacuum drum 116 to the application vacuum drum 120. In alternative embodiments the motor 154 may be positioned beneath the spindle 118 to provide direct control via a drive shaft. The cut articles are then applied to items as they travel along a path that is tangential to the application drum 120 as generally indicated at 150. The system may also include a conventional timing screw for consistently delivering items one at a time to the application station. The application station 150 may further include a sensor 151 for identifying error conditions such as the absence of an item when one is expected at the application station 150.

Figure 10:
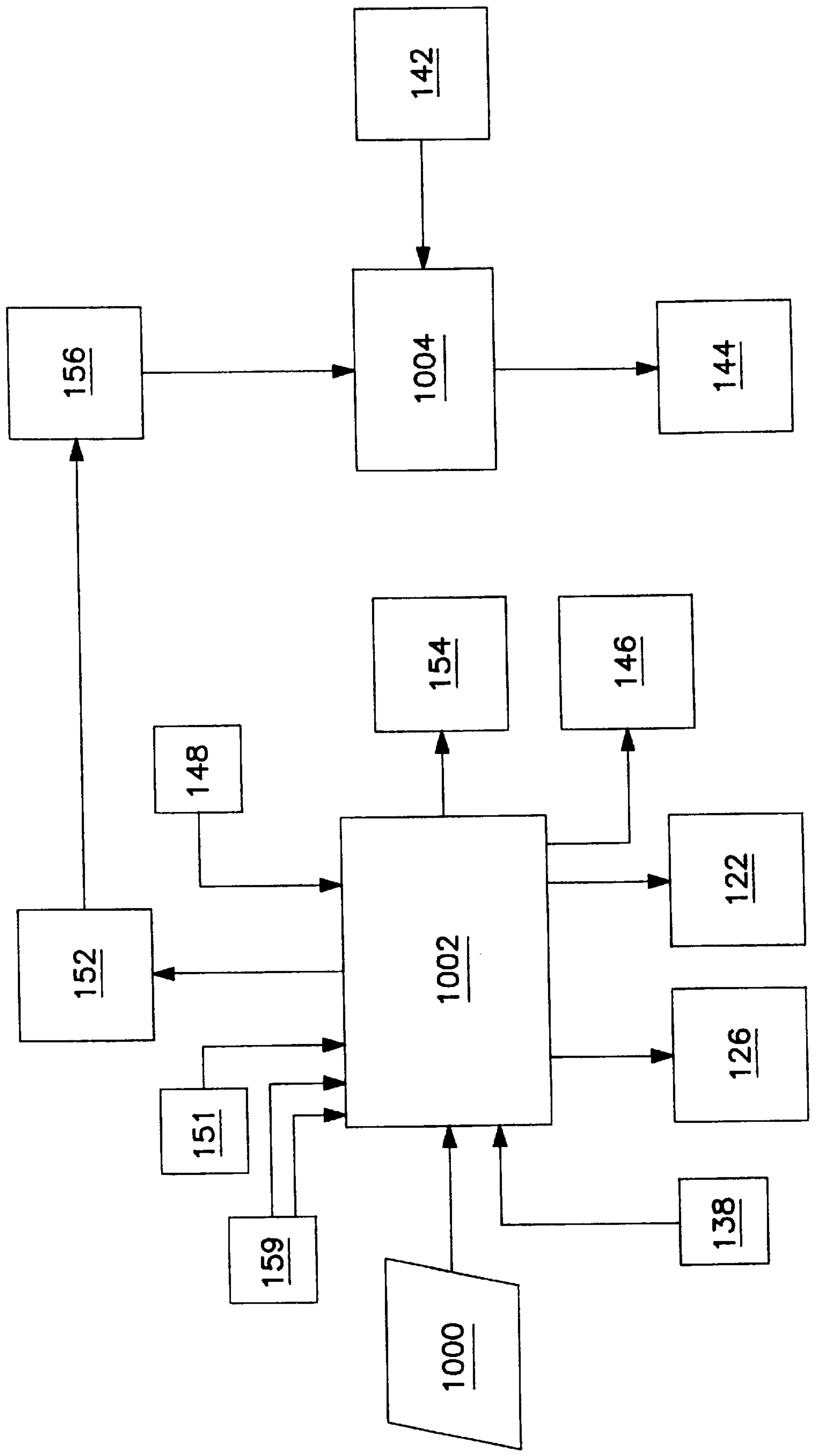
FIG. 10 is a functional block diagram of the operation of an article cutting machine including a transfer system in accordance with the invention.

With reference to FIG. 10, the operation of the system begins with a user inputting information through an interface 1000 to a computer processing system 1002 which may include a variety of subcontrollers, servo-controllers, or drivers. The computer 1002 either directly or indirectly controls the speed of the free loop motor 126, the transfer motors 122 and 154, the scrap take up motor 146, and the motor 152 that drives the belt drive pulleys 110. Feedback from sensors 138 is used to adjust the speed of the motor 126, and feedback from sensor 148 is used to adjust the speed of motor 154.

With regard to the operation of the correction spindle 118, generally, if a label at sensor 148 is late, the correction spindle will move more quickly to bring the label into proper timing. The output from the sensor 148 is also monitored to slow the speed of the drive pulley motor 110 if the labels are spaced too close together on the drum 118. In particular, in a preferred embodiment, a timing screw 161 is employed at the application station 150 that outputs one bottle per revolution. An optical encoder 159 is connected to the drive for the timing screw 161. The encoder 159 generates two signals. One is a pulse for every revolution of the timing screw 161. Each such pulse represents the presentation of one item to be labelled at the cutting station. The other signal is a pulse train generated as the timing screw turns. Sensor 148 identifies the transfer of a label to the correction spindle 118. While the timing screw turns, the pulses of the pulse train signal are counted, and simultaneously the output of sensor 148 is monitored and compared against a standard. By this method, it can be determined whether the label on the correction spindle is on time, late, or early with respect to a standard, and further, it can be determined from the pulse trains the extent to which the label is late or early as may be the case. Accordingly, the speed of rotation of the correction spindle may then be adjusted responsive to the number of elapsed pulses to bring the timing of the label on the spindle back into phase with the standard. The standard may be set by the first label cut and transferred from a new web. If too many of the labels need to be slowed down, the speed of the motor 110 driving the cutting station may be slowed down to facilitate correction at the correction spindle 118.

The output of sensor 151 is also input to the processor 1002 as shown so that the system may respond by employing a pick off roller to contact the application drum and pull the orphan label from the drum in the event that a fixed pick-up roller is not employed. The speed of movement of the belts 112 is monitored by a rotation sensor 156 similar to sensor 47 in FIG. 2.

The system also includes a rotating speed sensor 156 similar to sensor 47 as shown in FIGS. 1 and 2 which monitors the speed of movement of the drive pulleys 110 and therefore the web 130 through the cutting station 102. Feedback from this sensor 156 is provided through another computer processor 1004 to adjust, among other things, the time required to cut articles along the x-direction in the event that the speed of movement of the web 130 varies. As described above, the output from the sensor 142 is used to adjust the timing of the laser as well so that each label is cut at the appropriate place on the web.

The sensors 138, 142 and 148 may be any known type of sensors or switches such as electrical switches, electromechanical switches, photoelectric sensors, proximity sensors, and the like. The sensor 156 may be any type of known rotation speed sensor such as optical or mechanical encoders, resolvers, tachometers and the like. The sensor 159 on the timing screw 161 similarly may be any of the above, and is preferably a rotating optical encoder.

The cutting surface may be formed of various shapes, including but not limited to circular, polygonal, a continuous flexible surface, or a continuous oval loop including segmented sections as shown in the drawings. As shown in FIGS. 5 and 6, the cutting surface is preferably formed of a material having a large ratio of open area to solid area so as to facilitate the drawing of the vacuum through the surface, as well as to minimize the surface on which by-products of the cutting may accumulate. This also limits the amount of laser energy that may be reflected from the cutting surface, interfering with the desired cutting operation. Materials for the cutting surface are preferably those that are difficult for the laser to cut. If $CO_2$ lasers are used, suitable materials include but are not limited to aluminum and copper. Coatings of such materials may also be deposited on any base material (e.g., wire cloth, screen, expanded metal, perforated metal, and honeycomb mesh) to achieve a cost effective laser energy insensitive material. The base supporting the cutting surface may be one that is also relatively insensitive to the laser energy, yet is easily sized and adhered to the cutting surface.

In further embodiments, the web may comprise an active adhesive together with a liner, and the laser may be adapted to cut through the label only and not the liner. In this case, the cut labels could be removed from the web and handled as discussed above.

Those skilled in the art will appreciate that modifications and variations may be made to the above disclosed embodiments without departing from the spirit and scope of the invention.

What is claimed is:

1. An article transfer system for transporting articles cut from a blank of material traveling in a first direction, said system comprising:

a support member including support sections connected to one another along a continuous loop, and further including first and second surfaces and a plurality of openings extending between said first and second surfaces, said support member being movable along the first direction adjacent to said blank of material;

means for generating a lower pressure adjacent to said second surface of said support member than the pressure adjacent to said first surface thereof such that the blank is urged to maintain contact with said first surface of said support member; and a laser for cutting articles from said blank of material while said blank of material is maintained in contact with said support member.

2. An article transfer system as claimed in claim 1, wherein said support member comprises a rotatable laser resistant cutting surface.

3. An article transfer system as claimed in claim 1, wherein said means for generating a lower pressure adjacent to said second surface includes a vacuum means for generating a vacuum pressure adjacent to said second surface.

4. An article transfer system as claimed in claim 1, wherein said system further includes cleaning means for cleaning said support member of cutting debris.

5. An article transfer system as claimed in claim 4, wherein said cleaning means includes a forced air means for blowing air toward said support member.

6. An article transfer system as claimed in claim 4, wherein said cleaning means includes vacuum means for generating a vacuum adjacent to said support member.

7. An article transfer system as claimed in claim 1, wherein said laser generates a laser beam for cutting labels from said blank of material.

8. An article transfer system as claimed in claim 7, wherein said laser is capable of moving with respect to said blank of material in the direction back and forth in the direction of movement of said blank.

9. An article transfer system as claimed in claim 1, wherein said system further includes a pair of lasers for cutting said article from said blank of material.

10. An article transfer system as claimed in claim 1, wherein said labels are cut from said web yet remain with said web as the web travels in the first direction with said support member.

11. An article transfer system as claimed in claim 1, wherein said system further includes a speed sensor for generating a speed signal representative of the speed of movement of said support member.

12. An article transfer system as claimed in claim 11, wherein said system further includes a laser for generating a laser beam for cutting said article from said blank of material responsive to said speed signal.

13. An article transfer system as claimed in claim 1 wherein said blank of material comprises a linerless web of material, and said system further comprises a free loop chamber through which said web passes, said free loop chamber including a fan for blowing against said web to maintain a desired tension on said web as it leaves said free loop chamber.

14. An article transfer system as claimed in claim 1, wherein said system further includes support means for supporting said support member as it moves along said first direction adjacent to said blank of material.

15. An article transfer system as claimed in claim 14, wherein said support means includes a plurality of rollers on which said support member rides as it moves in said first direction adjacent to said blank of material.

16. An article transfer system as claimed in claim 1, wherein said articles are labels and said blank of material comprises a continuous web of linerless material.

17. An article transfer system as claimed in claim 1, wherein said support member further comprises a perforated material.

18. An article transfer system as claimed in claim 17, wherein said perforated material includes a protective coating.

19. An article transfer system as claimed in claim 17, wherein said perforated material includes a honeycomb mesh material.

20. In a labelling machine for cutting labels from a continuous web and applying them to items, a cutting assembly comprising:

a support member including first and second surfaces and a plurality of openings extending between said first and second surfaces, said support member being movable along the first direction adjacent to said web, and said support member comprising a plurality of discrete sections that form a continuous surface when they are mutually adjacent;

vacuum means for generating a lower pressure adjacent to said second surface of said support member than the pressure adjacent to said first surface thereof such that the web is urged to maintain contact with said first surface of said support member; and laser means for generating a laser beam for cutting labels from said web, said web being sensitive to the energy of said laser beam and said support member being relatively insensitive to the energy of said laser beam.

21. A system for cutting and transporting articles from a blank of material as said blank of material moves in a first direction, said system comprising:

a support member including first and second surfaces and a plurality of openings extending between said first and second surfaces, said support member being movable along the first direction adjacent to said blank of material, said support member comprising a plurality of discrete sections that form a continuous surface when they are mutually adjacent;

sensor means for generating a speed signal representative of the speed of movement of said support member; and laser means for generating a laser beam for cutting said articles from said blank responsive to said speed signal, said blank being sensitive to the energy of said laser beam and said support member being relatively insensitive to the energy of said laser beam.

22. An article transfer system for transporting articles cut from a blank of material traveling in a first direction, said system comprising:

a support member including first and second surfaces and a plurality of openings extending between said first and second surfaces, said support member being movable along the first direction adjacent to said blank of material;

support means for supporting said support member as it moves along said first direction adjacent to said blank of material, said support means including a plurality of rollers on which said support member rides as it moves in said first direction adjacent to said blank of material;

means for generating a lower pressure adjacent to said second surface of said support member than the pressure adjacent to said first surface thereof such that the blank is urged to maintain contact with said first surface of said support member; and a laser for cutting articles from said blank of material while said blank of material is maintained in contact with said support member.

* * * * *